United States Patent [19]

Minzenberger

[11] Patent Number: 5,150,576
[45] Date of Patent: Sep. 29, 1992

[54] VAPOR COLLECTING APPARATUS

[75] Inventor: Richard A. Minzenberger, Chicago, Ill.

[73] Assignee: Liquid Carbonic Corporation, Chicago, Ill.

[21] Appl. No.: 614,708

[22] Filed: Nov. 16, 1990

[51] Int. Cl.⁵ .................. F26B 21/06; B01D 47/00; F28C 1/00
[52] U.S. Cl. .......................... 62/11; 62/121; 34/73; 55/92
[58] Field of Search .............. 62/11, 121, 36, 304, 62/48.2; 34/73, 75; 55/92, 345

[56] References Cited

U.S. PATENT DOCUMENTS

| | | | |
|---|---|---|---|
| 3,116,122 | 12/1963 | Oetjen et al. | 34/75 X |
| 3,210,861 | 10/1965 | Eolkin | 34/75 X |
| 3,707,066 | 12/1972 | Carne et al. | 55/88 |
| 3,857,251 | 12/1974 | Alleaume | 62/28 |
| 3,860,401 | 1/1975 | Clark et al. | 55/92 X |
| 3,922,151 | 11/1975 | Kiss et al. | 55/92 |
| 4,009,048 | 2/1977 | Jensen et al. | 134/12 |
| 4,012,847 | 3/1977 | Rand | 34/75 |
| 4,118,873 | 10/1978 | Rothchild | 34/36 |
| 4,122,684 | 10/1978 | Clarkson et al. | 62/54 |
| 4,133,663 | 1/1979 | Skinner | 62/18 |
| 4,150,494 | 4/1979 | Rothchild | 34/28 |
| 4,188,793 | 2/1980 | Watson et al. | 62/51 |
| 4,337,582 | 7/1982 | Smith | 34/27 |
| 4,348,817 | 9/1982 | Bradshaw | 34/75 |
| 4,370,357 | 1/1983 | Swartz | 427/46 |
| 4,420,317 | 12/1983 | Stewart | 62/20 |
| 4,424,680 | 1/1984 | Rothchild | 62/48 |
| 4,444,016 | 4/1984 | Banerjee | 62/54 |
| 4,480,393 | 11/1984 | Flink et al. | 34/27 |
| 4,506,515 | 3/1985 | Bedolo | 62/93 |
| 4,551,981 | 11/1985 | Banerjee | 62/11 X |
| 4,569,727 | 2/1986 | McCord | 203/87 |
| 4,600,559 | 7/1986 | Hiatt | 422/89 |
| 4,666,480 | 5/1987 | Mann | 62/11 |
| 4,668,256 | 5/1987 | Billiet | 55/345 X |
| 4,675,037 | 6/1987 | Newton | 62/28 |
| 4,689,962 | 8/1987 | Lofredo | 62/54 |
| 4,734,109 | 3/1988 | Cox | 55/92 |
| 4,766,677 | 8/1988 | Brooks et al. | 34/78 |
| 4,776,105 | 10/1988 | Mishina et al. | 34/78 |
| 4,970,867 | 11/1990 | Herron et al. | 62/11 |

FOREIGN PATENT DOCUMENTS

| | | | |
|---|---|---|---|
| 2719126 | 11/1978 | Fed. Rep. of Germany | 34/75 |
| 2925742 | 1/1981 | Fed. Rep. of Germany | 34/75 |
| 838222 | 6/1960 | United Kingdom | 34/75 |
| 2098874 | 8/1984 | United Kingdom | |

OTHER PUBLICATIONS

Two-page brochure from Liquid Carbonic, Form No. 6897 entitled, "Liquid Carbonic Environmental Vapor Recovery System", published Oct. 24, 1989.

Primary Examiner—Henry A. Bennet
Assistant Examiner—Christopher B. Kilner
Attorney, Agent, or Firm—Fitch, Even, Tabin & Flannery

[57] ABSTRACT

A vapor collecting apparatus for extracting a condensed, liquefied volatile component carried by a solvent gas. The apparatus includes a single cryogen-cooled vessel into which the gas stream is introduced, along with a flow of liquid cryogen, preferably liquid nitrogen. The output from the vessel contains droplets of condensed vapor which are separated from the gas solvent in a cyclone separator.

8 Claims, 1 Drawing Sheet

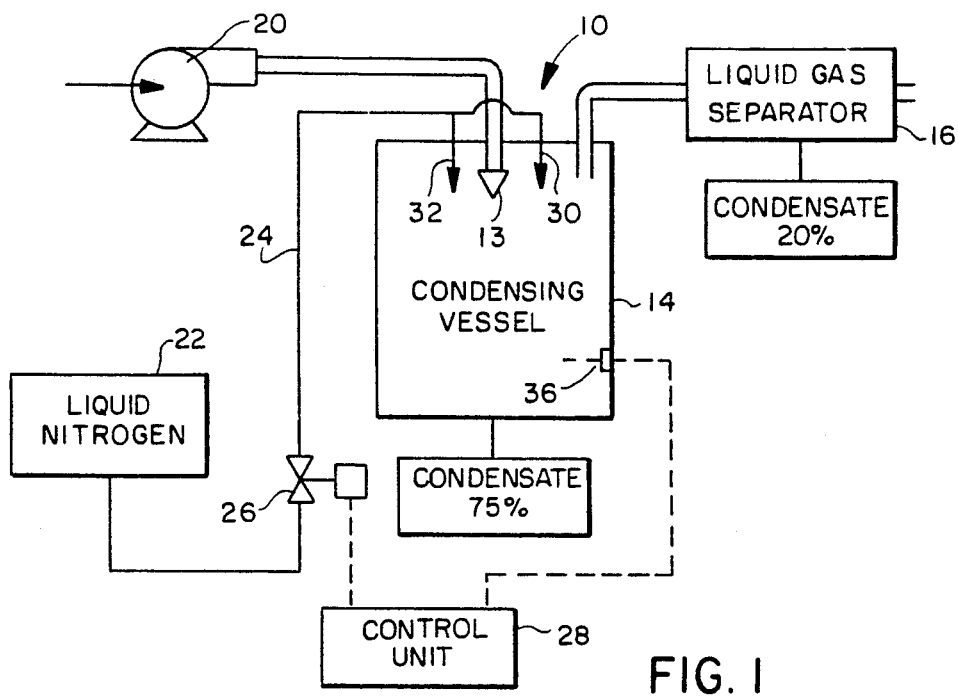
FIG. 1
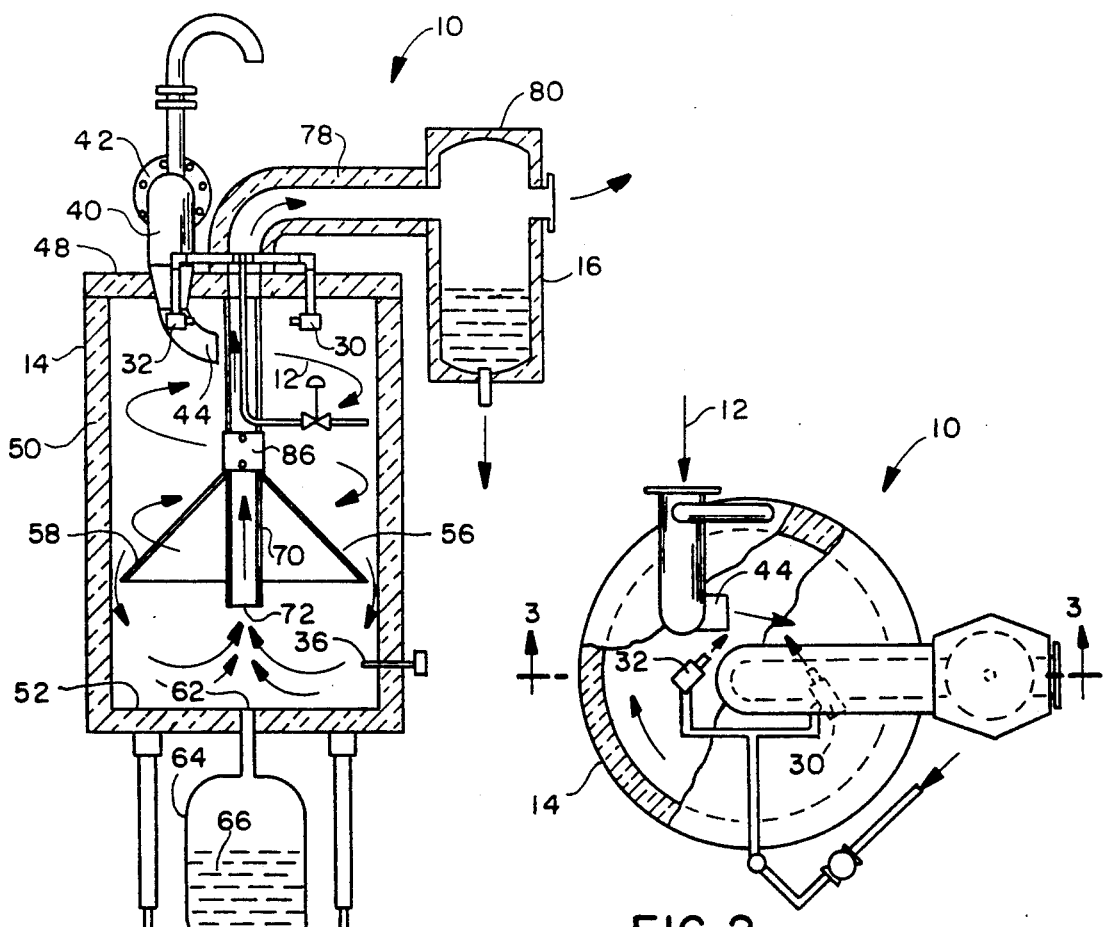
FIG. 2
FIG. 3

VAPOR COLLECTING APPARATUS

BACKGROUND OF THE INVENTION:

1. Field of the Invention

The present invention pertains to vapor collection, and in particular to the collection of condensable vapor from a carrier gas.

2. Description of the Related Art

In many commercial processes, it is desirable to recapture vapors of volatile materials. U.S. Pat. No. 4,424,680, for example, teaches a method of recovering condensable vapors using liquid nitrogen. The liquid nitrogen is introduced into a carrier gas, thereby cooling the volatile material contained therein, which is sought to be recovered. The volatile material condenses into a liquid form which, as taught in U.S. Pat. No. 4,424,680, can be recovered using conventional means. However, it is clear from subsequent experience that the separation of a liquefied volatile component from a carrier gas cannot be attained at commercially attractive production rates. That is, the separation efficiency is so low as to preclude the economic recovery in certain commercial applications. In effect, U.S. Pat. No. 4,424,680 assumes that the separation of a liquefied volatile component, present as a mist in a carrier gas, is a simple and straightforward matter, to be handled with conventional demisting apparatus. Such approaches have been found to be impractical with moisture laden streams of an organic solvent or carrier gas because of the hydrate formation on a demister pad surface, and the hydrate's freezing on the mesh pad surfaces which blocks flow through the separation portion of the system.

Further, U.S. Pat. No. 4,424,680 is prohibitively expensive to operate in certain commercial installations because of the temperature control which must be maintained in two separate insulated vessels. Two separate vessels are required, according to the patent, to form three distinct processing zones, two zones for condensation and the remaining third zone for separation of the mist from the product path.

Another example of vapor recovery is given in Great Britain Pat. No. 2,098,874 which teaches an arrangement for condensing vapor evolved from a volatile liquid into the ullage space of a storage vessel, using two cryogen-cooled vessels.

SUMMARY OF THE INVENTION

It is an object according the present invention to provide vapor recovery of improved, heretofore unattainable recovery efficiencies.

Another object according to the present invention is to provide a control over the mixing of the cryogen with a gas mixture, and to accommodate different gas mixture flow rates.

A further object according to the present invention is to provide an improved condensation of a volatile component within a gas mixture.

Yet another object according to the present invention is to provide an improved separation of the condensed or liquefied volatile component from the gas mixture from which it has been condensed.

These and other objects according to the present invention which will become apparent from studying the appended description and drawings, are provided in an apparatus for collecting a condensable vapor from a gas mixture including the vapor and a carrier gas, comprising:

a condenser vessel;

a first input means for inputting the gas mixture into the condenser vessel;

a second input means for inputting a cryogen component into the condenser vessel so as to condense the vapor;

a first output means for outputting a first portion of the condensed vapor from the condenser vessel, leaving a modified gas mixture with condensed vapor droplets entrained therein in the condenser vessel;

a second output means for outputting the modified gas mixture from the condenser vessel; and separator means coupled to the second output means for separating condensed vapor droplets from the modified gas mixture and for collecting the condensed vapor droplets.

BRIEF DESCRIPTION OF THE DRAWINGS

In the drawings, wherein like elements are referenced alike:

FIG. 1 is a schematic diagram of vapor collecting apparatus according to principles of the present invention;

FIG. 2 is a top plan view, shown partly broken away, of the vapor collecting apparatus; and FIG. 3 is a cross-sectional elevational view taken along the line 3—3 of FIG. 2.

DETAILED DESCRIPTION OF THE PREFERRED EMBODIMENT

Turning now to the drawings, a vapor collecting apparatus is generally indicated at 10. The apparatus processes a gas mixture 12 (see FIGS. 1 and 3) containing a volatile component in a carrier or solvent gas. Apparatus 10 recovers the volatile component using only two vessels, an insulated, temperature controlled condensing vessel 14 and a separator vessel 16. Up to 75% of the volatile component is collected from the condensing vessel 14 and up to 20% of the volatile component is collected as condensate from separator vessel 16, thus providing collection efficiencies of up to 95%.

Referring to FIG. 1, a flow of gas mixture to be processed by the present invention is indicated schematically by arrow 12, which enters the top of condensing vessel 14. If desired, a pump 20 may be used to provide a controlled flow rate of the gas mixture thereby providing the capability of adjusting the throughput of product through apparatus 10. The gas mixture is cooled with an inert cryogen, preferably liquid nitrogen. The liquid nitrogen is obtained from a source 22 and fed through line 24 to the top of condensing vessel 14. A valve 26 meters the liquid nitrogen flow rate entering the condensing vessel, and preferably is of a type which is electronically controllable by a control unit 28.

According to one aspect of the present invention, the liquid nitrogen enters condensing vessel 14 through a pair of nozzles, identified by reference numerals 30, 32. Control unit 28 receives a control signal from thermocouple 36 and responds thereto by varying the flow rate of liquid nitrogen in line 24.

Turning now to FIGS. 2 and 3, the condensing vessel 14 is preferably of generally cylindrical configuration and is thermally insulated so as to maintain operating temperatures of the product components therein, which are cooled by expansion of the liquid nitrogen being injected. A first inlet pipe 40 has a pipe flange 42 at its entrance end and a generally tangentially directed discharge 44. The discharge 44 is located adjacent the upper endwall 48 of vessel 14 and, as gas mixture leaving the discharge 44 contacts the rounded cylindrical sidewalls 50 of vessel 14, the gas mixture is directed in a generally clockwise direction as it descends toward the bottom wall 52 of vessel 14.

According to one aspect of the present invention, the two nozzles 30, 32 are oppositely directed and are oriented for concurrent flow with respect to the gas flow leaving discharge 44. Nozzle 30, for example, is generally tangentially directed, in the same direction as the flow of gas mixture leaving discharge 44. The second nozzle, nozzle 32 is tangentially directed in generally the same direction as gas flow leaving discharge 44 for a concurrent flow therewith. The nozzles are aligned to cause a cyclonic flow pattern.

The combined turbulent gas flow proceeds toward the bottom portion of vessel 14, but is interrupted by a flat or conical baffle 56. Baffle 56 opens in a downward direction, and has a lower peripheral edge 58 closely spaced from the sidewalls 50 of vessel 14. Thus, the combined gas flow is made to pass through the narrow annulus formed between baffle 56 and sidewall 50. Condensed vapor forms on the baffle and travels to the peripheral edge 58, dropping to the vessel bottom. Baffle 56, in effect, forms a quiescent mixing zone underneath the baffle which allows heavier droplets of condensed, liquefied volatile component to settle out of the gas mixture and collect in the bottom portion of condenser vessel 14.

An aperture output means 62 is provided in the bottom of vessel 14 to collect the condensate, directing the condensate to a first collection vessel 64 which fills with the condensed volatile component 66. According to experiments which have been conducted with apparatus 10, about 75% of condensable vapors entrained in gas mixture 12 are recovered in condenser vessel 14.

The remaining modified gas mixture, according to another important aspect of the present invention, passes out of condenser vessel 14 through second output means preferably comprising a dip tube 70 having a lower entrance end 72 proximate to but spaced from bottom wall 52 and an upper end which passes through vessel 14 at the upper portion thereof, preferably passing through the upper end 48 of vessel 14. The modified gas mixture then passes through an intermediate conduit portion 78, entering the second vessel of apparatus 10, the separator vessel 16 which preferably comprises a cyclone separator of conventional construction. Thus, only one cryogen-cooled chamber 14 is employed by the present invention.

According to another important aspect of the present invention, the mist of condensed volatile component carried in the modified gas mixture passing through tube 70 in a countercurrent direction receives additional cooling as the mixture travels through tube 70, which is cooled by the turbulent cryogen flow contacting the upper portion of the tube and a quiescent flow of cryogen underneath baffle 56 contacting the lower portion of the tube.

According to experiments conducted with the apparatus according to the present invention, the vapor mist leaving the condenser vessel 14 is 5° F. to 10° F. colder than the equilibrated vapor in the bottom portion of condenser vessel 14, the additional cooling being provided as the vapor travels through the dip tube 70 in a countercurrent direction. This additional cooling provides increased collection efficiency by insuring that substantially all of the vapor passing through tube 70 is equilibrated at below its saturation temperature prior to entering the final separation of stage of cyclone 80.

The modified gas mixture is then directed through intermediate conduit 78 to cyclone separator 80 where entrained vapor droplets in the modified gas mixture drop out, being collected in the bottom portion of vessel 16. Experiments using the apparatus according to the present invention show that an additional 20% of the volatile component entering apparatus 10 is collected, thus bringing the total collection efficiency up to 95%.

According to further aspects of the present invention, apparatus 10 can be adjusted to optimize collection efficiency, despite differing incoming flow rates of the gas mixture entering vessel 14 through discharge 44. Adjustment is provided by controlling the ratio of the turbulent mixing and quiescent mixing portions of the interior of vessel 14. This adjustment is provided by moving baffle 56 toward and away from bottom wall 52, sliding the baffle along tube 70. A collar 86 is provided for sliding baffle 56 along tube 70.

The combination of a variable mixing zone, concurrent liquid nitrogen flows, the dip tube in the collecting vessel and the countercurrent flow therethrough and a second stage for droplet extraction, have been found to provide very attractive collection efficiencies.

From the foregoing it will be appreciated that the invention provides a novel and improved apparatus for extracting a condensed, liquefied volatile component carried by a solvent gas. The invention is not limited to the embodiments described above or to any particular embodiments. The invention is described in the following claims.

What is claimed is:

1. Apparatus for collecting a condensable vapor from a gas mixture including the vapor and a carrier gas, comprising:
    a condenser vessel;
    a first input means for inputting the gas mixture into the condenser vessel;
    a second input means for inputting a cryogen component into the condenser vessel so as to condense the vapor;
    a first output means for outputting a first portion of the condensed vapor from the condenser vessel, leaving a modified gas mixture with condensed vapor droplets entrained therein in the condenser vessel;
    a second output means for outputting the modified gas mixture from the condenser vessel;
    separator means coupled to the second output means for separating condensed vapor droplets from the modified gas mixture and for collecting the condensed vapor droplets; and
    means disposed within the condenser vessel to divide the interior thereof into a turbulent flow region and a quiescent flow region;
    wherein the first and second input means are located in the turbulent flow region and the first and second output means are located in the quiescent flow region.

2. Apparatus for collecting a condensable vapor from a gas mixture including the vapor and a carrier gas, comprising:
    a condenser vessel;

a first input means for inputting the gas mixture into the condenser vessel;

a second input means for inputting a cryogen component into the condenser vessel so as to condense the vapor;

a first output means for outputting a first portion of the condensed vapor from the condenser vessel, leaving a modified gas mixture with condensed vapor droplets entrained therein in the condenser vessel;

a second output means for outputting the modified gas mixture from the condenser vessel; and separator means coupled to the second output means for separating condensed vapor droplets from the modified gas mixture and for collecting the condensed vapor droplets;

wherein the condenser vessel has top and bottom end portions and the second output means comprises a dip tube extending into the condenser vessel from the top portion thereof, the dip tube having an entry end spaced from the bottom of the condenser vessel and an exit end at the top portion of the condenser vessel.

3. Apparatus for collecting a condensable vapor from a gas mixture including the vapor and a carrier gas, comprising:

a condenser vessel;

a first input means for inputting the gas mixture into the condenser vessel;

a second input means for inputting a cryogen component into the condenser vessel so as to condense the vapor;

a first output means for outputting a first portion of the condensed vapor from the condenser vessel, leaving a modified gas mixture with condensed vapor droplets entrained therein in the condenser vessel;

a second output means for outputting the modified gas mixture from the condenser vessel; and separator means coupled to the second output means for separating condensed vapor droplets from the modified gas mixture and for collecting the condensed vapor droplets;

wherein the first and second input means and the second output means are located adjacent the top of the condenser vessel.

4. Apparatus for collecting a condensable vapor from a gas mixture including the vapor and a carrier gas, comprising:

a condenser vessel;

a first input means for inputting the gas mixture into the condenser vessel;

a second input means for inputting a cryogen component into the condenser vessel so as to condense the vapor;

a first output means for outputting a first portion of the condensed vapor from the condenser vessel, leaving a modified gas mixture with condensed vapor droplets entrained therein in the condenser vessel;

a second output means for outputting the modified gas mixture from the condenser vessel; and separator means coupled to the second output means for separating condensed vapor droplets from the modified gas mixture and for collecting the condensed vapor droplets;

wherein the condenser vessel is generally cylindrical and includes a sidewall extending between the top and bottom end portions thereof, the first input means has a discharge within the condenser vessel which is oriented for generally tangentially directed flow within the condenser vessel and the second input means comprises at least one nozzle disposed within the condenser vessel and oriented for flow generally in the same direction as the flow from the first input means.

5. Apparatus for collecting a condensable vapor from a gas mixture including the vapor and a carrier gas, comprising:

a condenser vessel;

a first input means for inputting the gas mixture into the condenser vessel;

a second input means for inputting a cryogen component into the condenser vessel so as to condense the vapor;

a first output means for outputting a first portion of the condensed vapor from the condenser vessel, leaving a modified gas mixture with condensed vapor droplets entrained therein in the condenser vessel;

a second output means for outputting the modified gas mixture from the condenser vessel; and separator means coupled to the second output means for separating condensed vapor droplets from the modified gas mixture and for collecting the condensed vapor droplets;

wherein the gas separator means comprises a cyclone separator.

6. Apparatus for collecting a condensable vapor from a gas mixture including the vapor and a carrier gas, comprising:

a condenser vessel;

a first input means for inputting the gas mixture into the condenser vessel;

a second input means for inputting a cryogen component into the condenser vessel so as to condense the vapor;

a first output means for outputting a first portion of the condensed vapor from the condenser vessel, leaving a modified gas mixture with condensed vapor droplets entrained therein in the condenser vessel;

a second output means for outputting the modified gas mixture from the condenser vessel;

separator means coupled to the second output means for separating condensed vapor droplets from the modified gas mixture and for collecting the condensed vapor droplets; and a baffle means disposed within the condenser vessel to divide the interior thereof into turbulent and quiescent flow regions, with the entry end of the second output means located in the quiescent flow region;

wherein the second output means comprises a dip tube and the baffle means comprises a baffle plate disposed about the dip tube.

7. The apparatus of claim 6 further comprising means for mounting the baffle plate for movement along the dip tube, so as to be movable toward and away from the bottom of the condenser vessel, to divide the vessel into variably proportioned mixing zones with a turbulent mixing zone above the baffle and a quiescent mixing zone beneath the baffle.

8. The apparatus of claim 6 wherein the baffle plate is generally conical, opening in a downward direction, and the baffle plate has an outer edge closely spaced from the condenser vessel so as to constrict flow through the vessel.

* * * * *